(No Model.)
J. DESMOND.
LUBRICATOR.
No. 510,633. Patented Dec. 12, 1893.
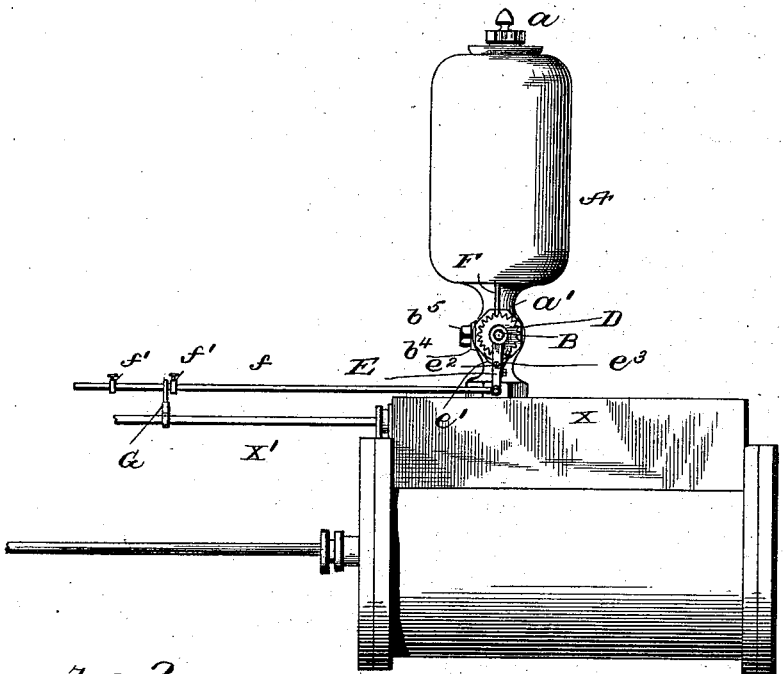
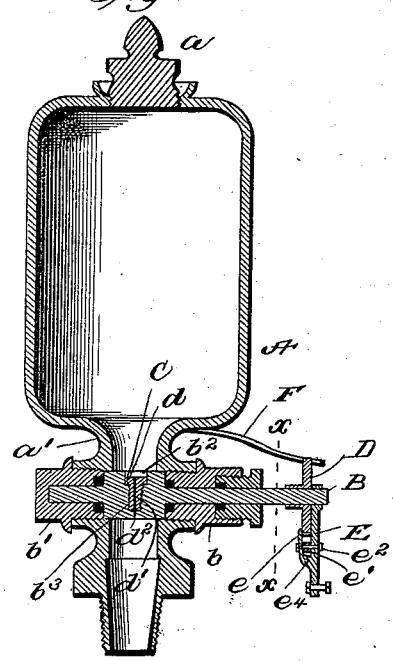
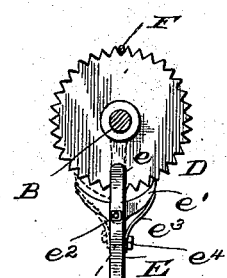
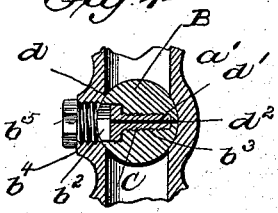
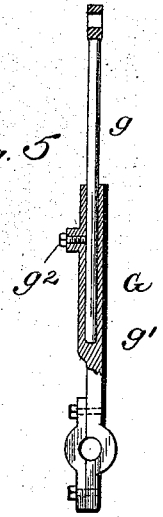
Witnesses
Inventor
John Desmond
Attorney

UNITED STATES PATENT OFFICE.

JOHN DESMOND, OF DETROIT, MICHIGAN, ASSIGNOR TO THE CHAPLIN-FULTON MANUFACTURING COMPANY, OF PITTSBURG, PENNSYLVANIA.

LUBRICATOR.

SPECIFICATION forming part of Letters Patent No. 510,633, dated December 12, 1893.

Application filed June 14, 1893. Serial No. 477,581. (No model.)

*To all whom it may concern:*

Be it known that I, JOHN DESMOND, of Detroit, in the county of Wayne and State of Michigan, have invented certain new and useful Improvements in Graphite Lubricators; and I do hereby declare the following to be a full, clear, and exact description of the invention, such as will enable others skilled in the art to which it appertains to make and use the same.

This invention contemplates certain new and useful improvements in lubricators and is specially designed for feeding flake-graphite to a steam engine.

The object of the invention is to provide a lubricator for effecting the automatic introduction of flake-graphite to a steam engine and in which the graphite is prevented from clogging in the cup or vessel and is kept in a loose state so that it can be readily discharged.

The invention comprises a lubricator for supplying flake-graphite to a steam engine, the essential features being a cup or vessel having a lower uninterrupted discharge port, a rotary feed-shaft having a hole or recess of varying capacity designed to coincide with said discharge port, and means connected to said rotary feed-shaft and also to some movable part of the steam engine for effecting the gradual rotation of said feed-shaft.

The invention further comprises a graphite lubricator having a cup or vessel designed to contain flake-graphite to be automatically fed to a steam engine, a port or passage-way being provided to periodically admit a small quantity of steam to said cup or vessel.

The invention further comprises a graphite lubricator having a cup or vessel designed to contain flake-graphite and a feed-shaft extended through the discharge end of said vessel having a hole or recess of variable capacity and a port or passage way to periodically admit a small quantity of steam to said cup or vessel.

The invention also comprises the details of construction, combination and arrangement of parts, substantially as hereinafter fully set forth and particularly pointed out in the claims.

In the accompanying drawings:—Figure 1 is a view showing my improved lubricator applied to a steam-chest. Fig. 2 is a vertical sectional view on an enlarged scale. Fig. 3 is a cross-sectional view on line $x$—$x$, Fig. 2. Fig. 4 is an enlarged view of a portion of the rotary shaft. Fig. 5 is a detail.

Referring to the drawings, A designates a cup or vessel having its upper supply opening closed by a plug $a$. From the lower discharge end of this cup or vessel projects a hollow tubular extension $a'$ which is designed to be screwed into a steam chest X, or a steam-pipe or other suitable point in or about an engine. The cup or vessel is supplied with flake-graphite the properties of which for internal lubrication I have found superior to any other lubricant known to the art. To automatically feed this flake-graphite to the steam-chest, or other part of an engine and at the same time preserve the supply in a loose state and keep it from clogging is the second important part of my invention, which I will now proceed to describe.

B is the rotary feed-shaft which is passed longitudinally through the discharge extension $a'$ and supported by screw-plugs $b$, $b'$ fitted in opposite openings. That portion of the shaft coincident with the discharge port or opening in extension $a'$ is of greater diameter than the remaining portion thereof and in it is formed a circular hole or recess $b^2$ from the inner end of which extends a reduced threaded hole $b^3$ which extends to near the opposite side of the shaft. In this threaded hole is designed to work a screw C, the head $d$ of which fits snugly in hole or recess $b^2$. By adjusting this screw the holding capacity of the hole or recess may be increased or lessened. Through the longitudinal center of this screw is formed a very small port or passage-way $d'$ which is coincident with a correspondingly small hole or port $d^2$ in shaft B at the end of hole $b^3$. By means of this passage-way a small quantity of steam is periodically admitted to the cup or vessel and thus the flake-graphite therein is kept in a loose state and prevented from clogging. In order to effect the adjustment of screw C without removing the rotary shaft I form an opening and hollow boss $b^4$ in the side of extension $a'$, the same being closed by a screw-plug $b^5$.

D is a ratchet wheel fast on shaft B. The teeth of this wheel are of approximately V-shape. Adjacent to this wheel one end of arm E is loosely mounted on said shaft, and to said arm is connected the inner end of a short arm $e$ which at its outer end overlaps the opposite side of wheel D. A double pawl $e'$ is fulcrumed between these arms E and $e$ by a pin $e^2$ passed through coincident holes in said arms and center of pawl. Either end of this pawl is held in engagement with the ratchet wheel by a plate spring $e^3$ made fast at its lower end by a screw $e^4$ passed through an eye $e^5$ of arm $e$. This spring can be transferred from one side of arm $e$ to the other. Hence the shaft B can be rotated in either direction according to the engagement of the double pawl. A spring rod or arm F leading from the lower end of cup A bears slightly upon ratchet wheel D and serves to hold the same as against reverse movement. To the lower end of arm E is connected one end of an operating rod $f$ upon which are mounted two adjustable blocks or stops $f'$. To the valve rod $x'$ is connected one end of an arm or pitman G the outer end of which is movable on rod $f$ between the blocks or stops $f'$. By adjusting these stops the extent of movement of the operating rod can be regulated and hence the feed shaft can be made to rotate the desired extent at each stroke according to the number of teeth of the ratchet wheel engaged by the pawl.

In order to provide for engines of different sizes the arm or pitman G is made in two telescoping sections $g, g'$, held rigidly together by a set-screw $g^2$. Hence the length of said arm or pitman may be readily regulated.

The advantages of my invention are apparent to those skilled in the art. By means thereof flake-graphite can be fed to the internal parts of an engine. It is impossible to feed flake-graphite by means of lubricators as heretofore constructed, but by means of my invention a gradual supply is continuously effected and the graphite in the cup or vessel is always kept in a loose state by reason of the periodical admission of a small quantity of steam.

In order to feed the flake-graphite the cup or vessel must have an uninterrupted discharge port or outlet sufficiently large to permit the graphite to pass out by gravity into the corresponding hole or recess in the feed-shaft. The properties of flake-graphite as a lubricant are such that there must be a uniform supply and at the same time no contraction of the discharge port can be permitted, since the same must be uninterrupted and of sufficient capacity to allow the graphite to pass freely to the feed shaft. Any contraction of said discharge port would result in totally stopping the discharge, or so nearly so as to seriously impair the usefulness of the lubricator.

The operation of the lubricator is obvious. The extent to which the feed-shaft is rotated at each operation of the valve rod is regulated by the stops on the operating rod. The shaft can be made to rotate in either direction according to the position occupied by the double pawl and its holding spring.

I claim as my invention—

1. A lubricator for supplying flake-graphite to the internal parts of a steam engine, comprising a cup or vessel provided with a lower uninterrupted discharge port and having means whereby steam may be periodically admitted thereinto, a feed shaft having a recess of varying capacity to receive said flake-graphite, and means for effecting the gradual rotation of said feed shaft, said means being operated by such steam engine or some movable part thereof, as set forth.

2. A lubricator for supplying flake-graphite to the internal parts of a steam engine, comprising a cup or vessel into which a port or passage-way opens for periodically admitting steam to said cup or vessel having a lower uninterrupted discharge port, a rotary feed-shaft having a recess designed to coincide with said discharge-port, and also provided with a port or passage-way for periodically admitting steam to said cup or vessel, and means connected to said rotary feed-shaft and to the engine for rotating said shaft, substantially as set forth.

3. A lubricator for supplying flake-graphite to the internal parts of an engine comprising a cup or vessel, a feed-shaft having a recess of varying capacity, and means for effecting the gradual rotation of said feed-shaft, as set forth.

4. The herein-described improved lubricator for supplying flake-graphite to a steam engine, comprising the cup or vessel provided with a lower uninterrupted discharge port, and having means whereby steam may be periodically admitted thereinto the rotary feed-shaft having a recess corresponding to said discharge port, an adjustable screw in said recess for varying the capacity thereof, and means for gradually rotating said shaft connected to some movable part of the engine, substantially as set forth.

5. The herein-described improved lubricator, comprising the cup or vessel, the rotary feed-shaft having a recess and a port or passage-way, the screw fitted in said recess and having a longitudinal port or passage-way coincident with said former port or passage-way, and means for effecting the gradual rotation of said shaft, substantially as set forth.

6. In a lubricator for supplying flake-graphite, the combination with the cup or vessel having a lower uninterrupted discharge port, and also having a lower tubular extension provided with an opening in its sides, of the rotary feed-shaft having a recess corresponding to said discharge port, an adjustable screw having its head fitting in said recess for varying the capacity thereof, access to said screw being had through said side opening, whereby adjustment can be effected without removing said feed-shaft and means for gradually rotating said shaft, substantially as set forth.

7. The combination with the steam chest of an engine and a sliding-valve, of a lubricator for supplying flake-graphite an operating rod, adjustable stops on said rod, and the telescoping arm or pitman movable on said rod between said stops and connected at its lower end to the rod of said sliding-valve, substantially as set forth.

8. The combination with the steam-chest of an engine and the sliding valve, of the cup or vessel designed to contain flake-graphite having a lower extension and an uninterrupted port, the feed-shaft located in said extension having a port and a recess, an adjustable screw fitted in said recess, and having a port coincident with said former port, the ratchet wheel fast on said shaft, the arm pivoted on said shaft, the pawl carried by said arm, the spring bearing against said pawl, the operating-rod connected to said arm, and adjustable means for operating said rod connected to some movable portion of the engine, substantially as set forth.

In testimony whereof I have signed this specification in the presence of two subscribing witnesses.

JOHN DESMOND.

Witnesses:
J. NOTA MCGILL,
WM. S. HODGES.